United States Patent
Zimmer et al.

(10) Patent No.: US 7,412,619 B2
(45) Date of Patent: Aug. 12, 2008

(54) INTEGRATED CIRCUIT CAPABLE OF ERROR MANAGEMENT

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 11/085,421

(22) Filed: Mar. 21, 2005

(65) Prior Publication Data

US 2006/0236166 A1 Oct. 19, 2006

(51) Int. Cl.
G06F 11/00 (2006.01)
(52) U.S. Cl. .............. 714/6; 714/8; 714/7; 714/710; 714/720
(58) Field of Classification Search ............ 714/6, 714/7, 8, 710, 720
See application file for complete search history.

(56) References Cited

U.S. PATENT DOCUMENTS

| | | | | |
|---|---|---|---|---|
| 4,471,427 | A * | 9/1984 | Harris | 710/22 |
| 5,524,212 | A | 6/1996 | Somani et al. | |
| 5,701,516 | A * | 12/1997 | Cheng et al. | 710/22 |
| 5,860,083 | A | 1/1999 | Sukegawa | |
| 5,933,852 | A * | 8/1999 | Jeddeloh | 711/153 |
| 6,016,530 | A | 1/2000 | Auclair et al. | |
| 6,052,798 | A * | 4/2000 | Jeddeloh | 714/8 |
| 6,345,368 | B1 * | 2/2002 | Bergsten | 714/11 |
| 6,360,306 | B1 * | 3/2002 | Bergsten | 711/162 |
| 6,446,175 | B1 * | 9/2002 | West et al. | 711/162 |
| 6,629,192 | B1 | 9/2003 | Schaefer et al. | |
| 6,782,453 | B2 * | 8/2004 | Keltcher et al. | 711/133 |
| 6,907,505 | B2 * | 6/2005 | Cochran et al. | 711/162 |
| 6,925,533 | B2 * | 8/2005 | Lewis | 711/118 |
| 6,973,517 | B1 | 12/2005 | Golden et al. | |
| 7,020,034 | B2 * | 3/2006 | Chen | 365/200 |
| 7,055,055 | B1 | 5/2006 | Schneider et al. | |
| 7,275,179 | B1 * | 9/2007 | Coatney | 714/7 |
| 2002/0083264 | A1 | 6/2002 | Coulson | |
| 2003/0177322 | A1 * | 9/2003 | Crockett et al. | 711/161 |
| 2005/0033908 | A1 | 2/2005 | Chong et al. | |

(Continued)

FOREIGN PATENT DOCUMENTS

WO  WO-9750035 A1  12/1997

(Continued)

OTHER PUBLICATIONS

PCI Express Base Specification Revision 1.0, Jul. 22, 2002, 15 pgs.

(Continued)

Primary Examiner—Bryce P Bonzo
(74) Attorney, Agent, or Firm—Grossman, Tucker, Perreault & Pfleger, PLLC

(57) ABSTRACT

A method according to one embodiment may include receiving a write request to write data in a local storage device. The method of this embodiment may also include detecting a write error in the local storage device. The method of this embodiment may also include reserving a reserved area in the local storage device and remapping the data corresponding to the write error to the reserved area of the local storage device. Of course, many alternatives, variations, and modifications are possible without departing from this embodiment.

20 Claims, 9 Drawing Sheets

U.S. PATENT DOCUMENTS

| | | | |
|---|---|---|---|
| 2005/0134250 | A1 | 6/2005 | Kim et al. |
| 2006/0010227 | A1* | 1/2006 | Atluri .................. 709/217 |
| 2006/0026338 | A1 | 2/2006 | Ebara et al. |
| 2006/0184717 | A1 | 8/2006 | Rothman et al. |
| 2006/0195667 | A1* | 8/2006 | Nakano et al. .......... 711/162 |
| 2006/0212762 | A1 | 9/2006 | Zimmer et al. |

FOREIGN PATENT DOCUMENTS

| | | |
|---|---|---|
| WO | 088636 A1 | 8/2006 |
| WO | 2007109476 A1 | 9/2007 |

OTHER PUBLICATIONS

IEEE Std 802.3, Mar. 8, 2002, Revision of IEEE, STD 802.3, 2000 Edition, 802.3, IEEE Standard for Information Technology- Telecommunications and information exchange between systems—Local and metropolitan area networks—Specific requirements, Part 3: Carrier Sense Multiple Access with Collision Detection (CSMA/DC) Access Method and Physical Layer Specifications, 11 pgs.

The ATM Forum Technical Committee, ATM-MPLS Network Interworking, Version 1.0, 23 pgs. Aug. 2001.

Intel XScale Core, Developer's Manual, 220 pgs., Dec. 2000.

"International Search Report and Written Opinion of the International Searching Authority; Dated Jul. 24, 2006; PCT/US2006/003319", 11 pgs.

International Search Report and Written Opinion for application No. PCT/US2007/063980, mailed Aug. 28, 2007, 10 pgs.

Office Action received for U.S. Appl. No. 11/059,768 mailed Feb. 19, 2008, 8 pages.

Office Action received for U.S. Appl. No. 11/059,768 mailed Apr. 11, 2007; 6 pages.

Office Action received for U.S. Appl. No. 11/059,768 mailed Nov. 28, 2007; 6 pages.

\* cited by examiner

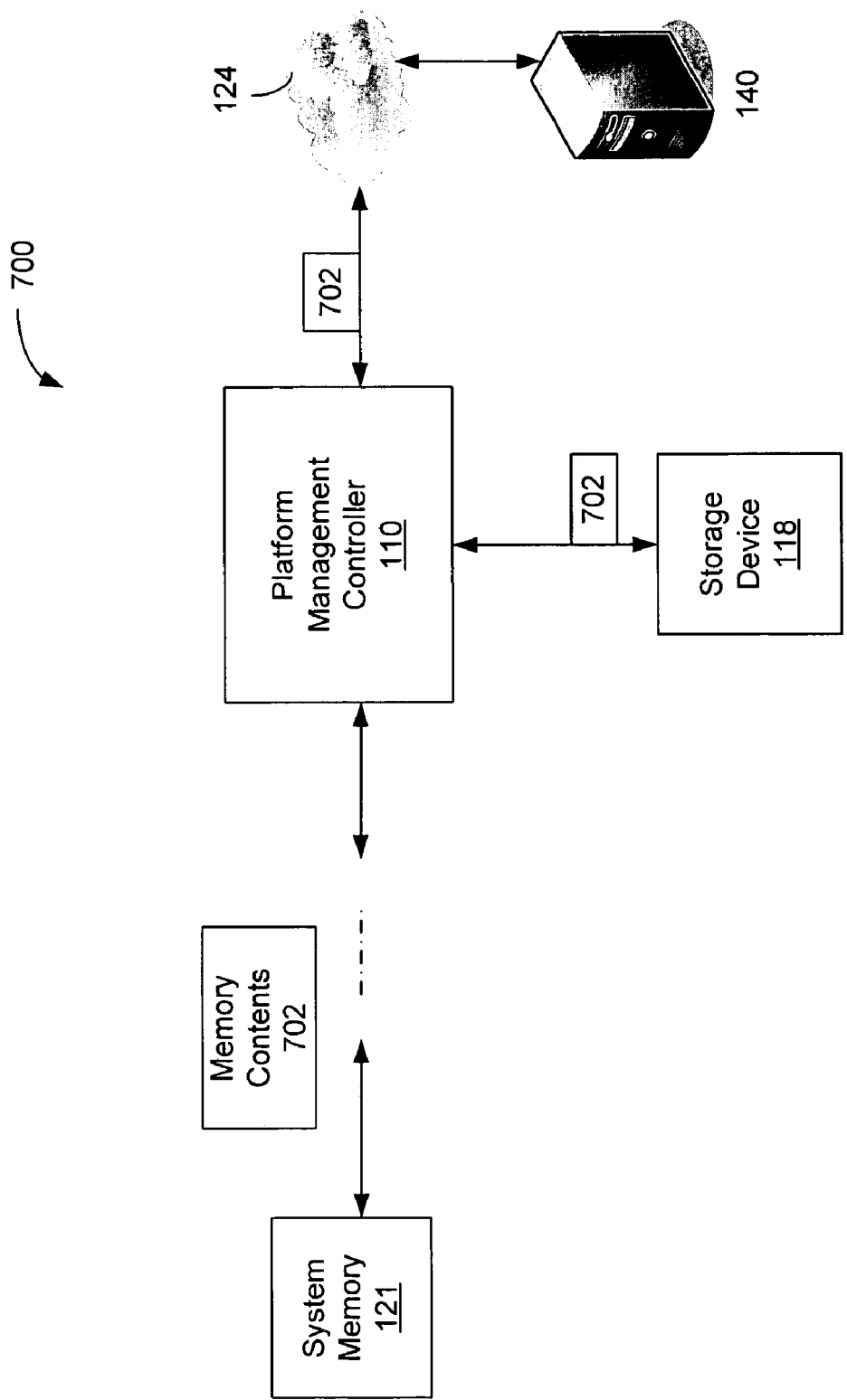

INTEGRATED CIRCUIT CAPABLE OF ERROR MANAGEMENT

FIELD

The present disclosure relates to an integrated circuit capable of error management.

BACKGROUND

One conventional computer system may include a host processor running one or more operating systems and applications and may be capable of read and write transactions to a local storage system. In the conventional computer system, a write transaction to the local storage device may encounter an error. The conventional system is not capable of resolving a write error based on system policy information. Further, the host system may include system memory, and the host system may encounter a critical error. The conventional system is incapable of resolving the critical error to retrieve the contents of system memory.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
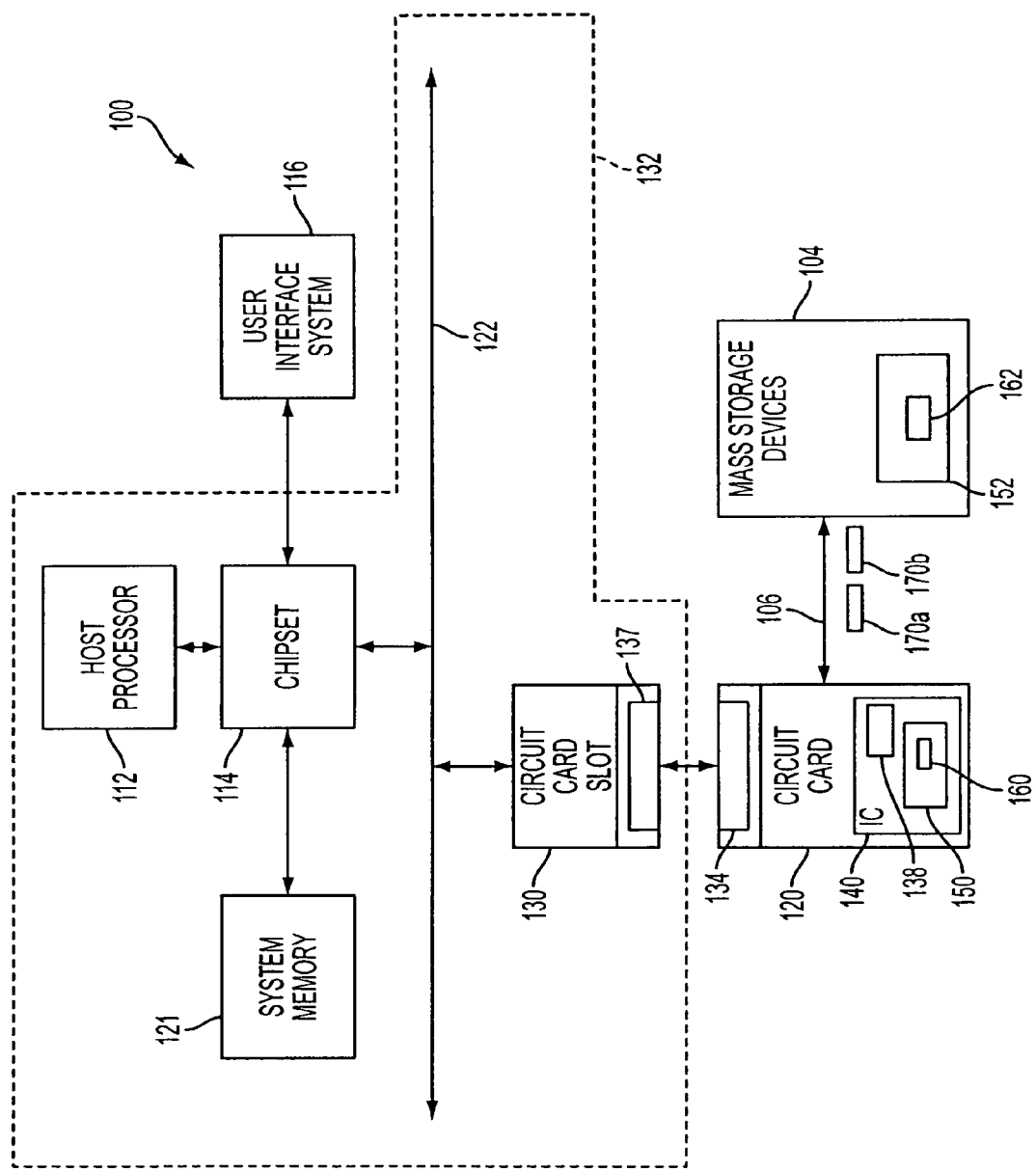
FIG. 1 is a diagram illustrating a system embodiment.

FIG. 1 illustrates a system embodiment 100 of the claimed subject matter. The system 100 may generally include a host processor 112, a first bus 122, a second bus 126, a user interface system 116, a chipset 114, system memory 121, platform management controller circuitry 110, and flash memory 106. This embodiment may also include a storage device 118. Storage device 118 may include, for example, a magnetic, optical and/or semiconductor media, for example, a hard disk device. The host processor 112 may include any variety of processors known in the art such as an Intel® Pentium® IV processor commercially available from the Assignee of the subject application. The buses 122, 126 may include various bus types to transfer data and commands. For instance, bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 126 may include comply with a Serial Peripheral Interface (SPI) Specification (hereinafter referred to as an "SPI bus"). Processor 112, system memory 121, chipset 114, buses 122 and 126, flash memory 106 and platform management controller circuitry 110 may be comprised in a single circuit board, for example, motherboard 132, and these components collectively or individually may form a host system.

The user interface 116 may include a variety of devices for human users to input commands and/or data and to monitor the system such as a keyboard, pointing device, and video display. The chipset 114 may include host bridge/hub system (not shown) that couples the processor 112, system memory 121, user interface system 116, storage device 118, and platform management controller circuitry 110 to each other and to the bus 122. Chipset 114 may also be capable of coupling flash memory 106, host processor 112, system memory 121 and platform management controller circuitry 110 to each other and to bus 126. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used.

System memory 121 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. In this embodiment, memory 106 may comprise a flash memory. Either additionally or alternatively, memories 121 and/or 106 may comprise other and/or later-developed types of computer-readable memory. Machine-readable firmware program instructions may be stored in memories 121 and/or 106. As described below, these instructions may be accessed and executed by host processor 112 and/or platform management controller 110. When executed by host processor 112 and/or platform management controller 110, these instructions may result in host processor 112 and/or platform management controller 110 performing the operations described herein as being performed by host processor 112 and/or platform management controller 110.

Host processor 112 may be capable, among other things, of generating one or more input/output (I/O) transactions to read and/or write data to or from local storage device 118. "Local", as used in any embodiment herein, may mean that the storage device 118 is physically or logically associated with host system 132. Host processor 112 may generate these I/O transactions in response to, for example, boot operations of the host system, operating system (OS) operations and/or applications (e.g., software applications executing one or more instructions on host processor 112 and/or firmware instructions running on the host system). Alternatively or additionally, add-in devices, for example, add-in cards (not shown) coupled to host system 132 and/or remote applications (not shown) may be capable of generating one or more input/output (I/O) transactions to read and/or write data to or from storage device 118.

Platform management controller circuitry 110 may be capable of controlling read and/or write access to storage device 118, via bus 122. As used in any embodiment herein, "circuitry" may comprise, for example, singly or in any combination, hardwired circuitry, programmable circuitry, state machine circuitry, and/or firmware that stores instructions executed by programmable circuitry. Also, in any embodiment herein, circuitry 110 may be embodied as, and/or form part of, one or more integrated circuits. As used in any embodiment herein, an "integrated circuit" means a semiconductor device and/or microelectronic device, such as, for example, a semiconductor integrated circuit chip. As will be described in greater detail herein, circuitry 110 may also be capable of discovering a write error to storage device 118 and remapping a data write to a different area of storage device 118. In response to a read request, circuitry 110 may be capable of redirecting the data read request to the different area on the storage device where the data may be residing as a result of remapping operation performed by circuitry 110.

Platform management controller circuitry 110 may also be capable of communicating with one or more remote system 140 via network 124 and communications link 125. Remote system 140 may comprise, for example, a remote server system or remote workstation (which may be similar to host system 132) which may comprise one or more storage devices and/or a storage array (which may comprise, for example a storage array coupled to and controlled by one or more remote systems). In this embodiment, remote system 140 may be capable of storing, at least partially, data that is stored on storage device 118. As will be described in greater detail below, platform management circuitry 110 may be capable of controlling read and/or write access to one or more remote systems 140 based on, at least in part a read and/or write access to storage device 118. In this embodiment, for example, circuitry 110 may also be capable of discovering a write error to storage device 118 Circuitry 110 may also be capable of determining if the data associated with the write error is located on one or more remote systems 140, and if so, creating a map to the data on the remote system 140. In response to a read request, circuitry 110 may be capable of retrieving the data from the remote system 140.

Platform management controller circuitry 110 may be capable of controlling read and/or write access to system memory 121, via bus 122 and chipset 114. Circuitry 110 may also be capable of detecting at least one host system critical error and reading the contents of system memory 121. A "critical error", as used in any embodiment herein, may comprise a condition which may cause host processor 112, and/or an OS or application running on host processor, and/or boot instructions (which may be stored in flash memory 106) to stop performing as intended (and which may render the host system 132 inoperable). Circuitry 110 may also be capable of writing the contents of system memory 121 to storage device 118 and/or to one or more remote systems 140.

Platform management controller circuitry 110 may also be capable of generating out-of-band (OOB) read and/or write operations to 106 and/or storage device 118. OOB read and/or write operations may comprise, for example, one or more read and/or write operations that are performed independent of an OS being executed by the host processor in host system 132.

Figure 2:
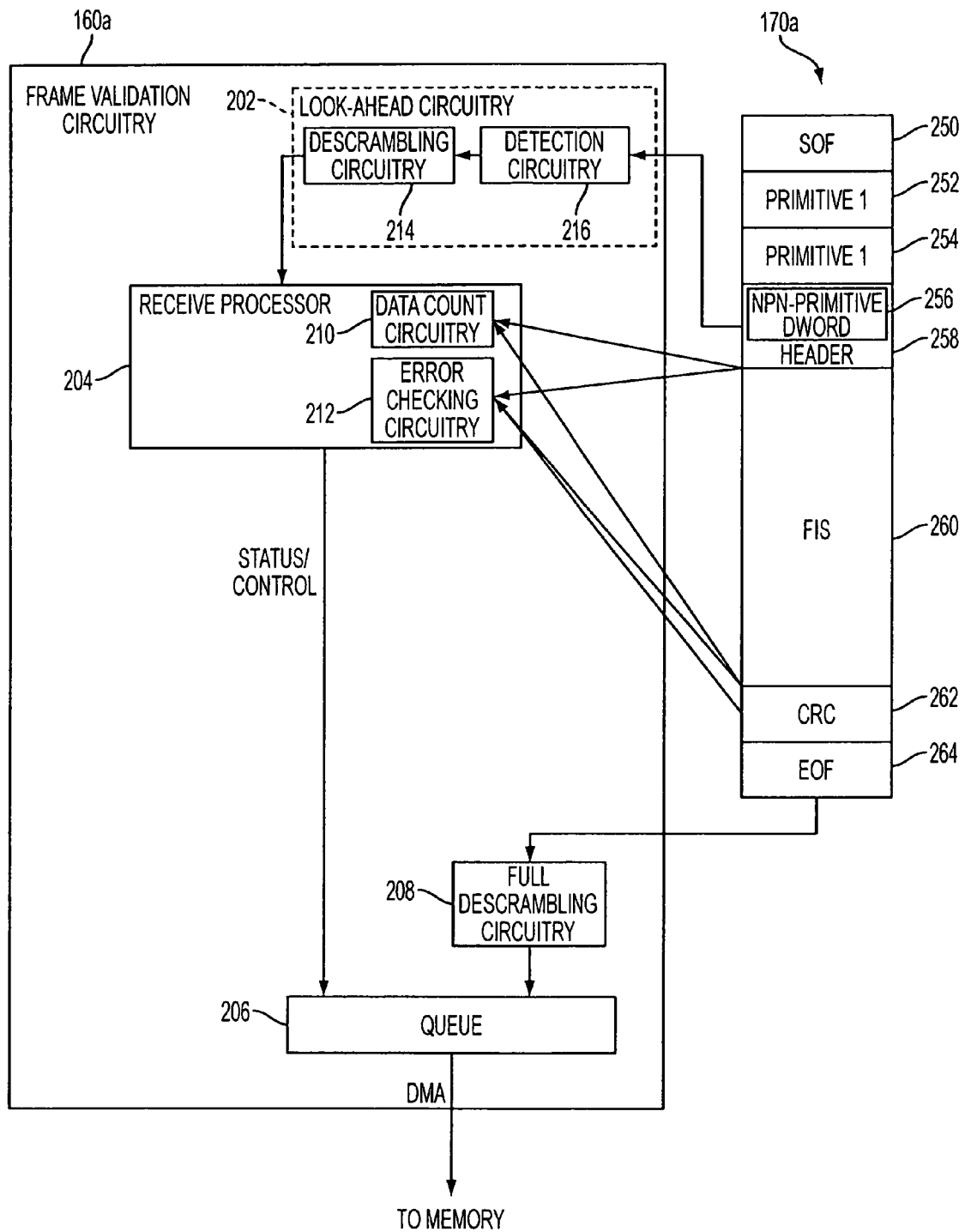
FIG. 2 is a diagram illustrating a platform management controller according to an embodiment.

FIG. 2 is a diagram illustrating in more detail platform management controller circuitry 110. In FIG. 2, certain portions of the system 100 depicted in FIG. 1 have been omitted for clarity (for example circuit board 132), but it is to be understood that like parts of FIG. 2 can be implemented in a manner consistent with an embodiment depicted in FIG. 1, or alternatively in other system implementations, without departing from this embodiment. Circuitry 110 may include processor circuitry 204 which may be capable of performing operations described herein as being attributed to platform circuitry 110. Processor circuitry 204 may comprise respective circuitry that may be compatible and/or in compliance with the Intel® XScale™ Core micro-architecture described in "Intel® XScale™ Core Developers Manual," published December 2000 by the Assignee of the subject application. Of course, processor circuitry 204 may comprise other types of processor core circuitry without departing from this embodiment. Circuitry 110 may also comprise memory 210. Memory 210 may comprise, for example, computer-readable program instruction memory that may contain respective sets of micro-code program instructions that processor circuitry 204 may execute. The execution of these respective sets of program instructions by processor circuitry 204 may result in the carrying out of operations described herein as being carried out by processor circuitry 204.

Memory 210 may comprise one or more platform policy instructions, which may define a rule or set of rules which may dictate for example, the management of storage device 118 and policy rules for read and/or write access to flash memory 106. Exemplary platform policy instructions may include the size of the reserved portion 204, enabling or disabling concealment of reserved portion 204, enabling and/or disabling read and/or write access to flash memory 106, priority rules associated with data write and/or read transactions to flash memory 106, and/or other platform policy instructions. Controller circuitry 304 may execute platform policy instructions during operation of platform management controller circuitry 110. Of course, these are only exemplary instructions and other platform policy instructions are equally contemplated herein.

In this embodiment, circuitry 110 may also include PCI Express (PCIe) interface circuitry 202 which may permit processor circuitry 204 to exchange commands and data with chipset 114 and/or storage device 118 via PCIe bus 122. Circuitry 110 may also include SPI interface circuitry 208 which may permit processor circuitry 204 to exchange commands and data with flash memory 106 via SPI bus 126. However, other bus technology and bus corresponding bus interface circuitry is equally contemplated by this embodiment. Circuitry 110 may further include network interface circuitry 206 which may permit processor circuitry 204 to exchange commands and data with one or more remote systems via network 124 and communications link 125.

Network 124 may comply or be compatible with an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternative or additionally, network 124 may be capable of communicating using an X.25 communications protocol. The X.25 communications protocol may comply or be compatible with a standard promulgated by the International Telecommunication Union-Telecommunication Standardization Sector (ITU-T). Alternatively or additionally, network 124 may be capable of communicating using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network 124 may be capable of communicating using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed communication protocols are equally contemplated herein.

Figure 3:
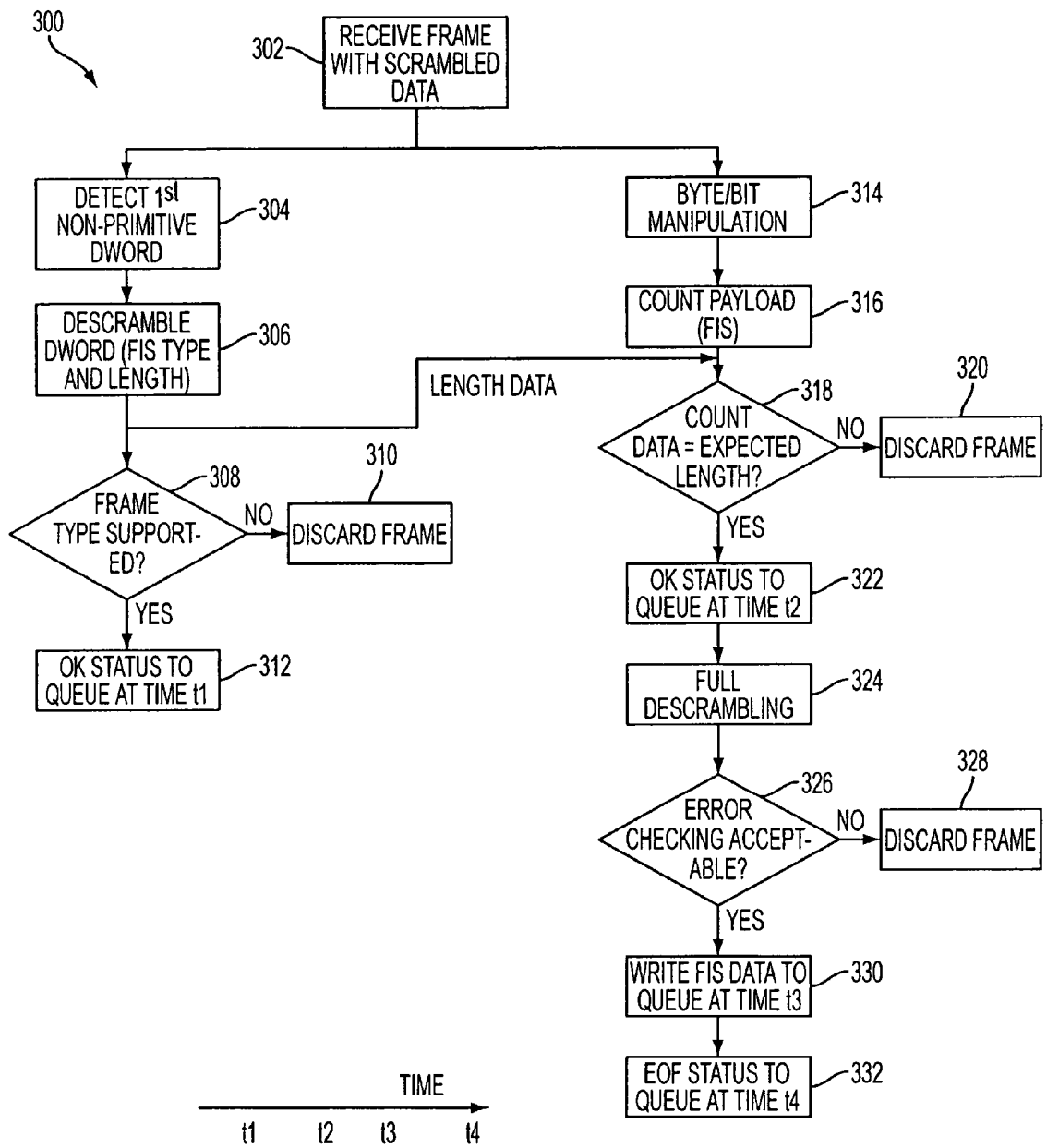
FIG. 3 is a diagram illustrating another system embodiment.

FIG. 3 is a diagram illustrating another system embodiment 300. In FIG. 3, certain portions of the system 100 depicted in FIG. 1 and platform management controller circuitry 110 depicted in FIG. 2 have been omitted for clarity (for example, circuit board 132, network 124 and remote system 140), but it is to be understood that like parts of FIG. 3 can be implemented in a manner consistent with an embodiment depicted in FIG. 1 and/or FIG. 2, or alternatively in other system implementations, without departing from this embodiment.

In this embodiment, storage device 118 may include a data area 302 and a reserved area 304. The data area 302 may comprise a plurality of sectors 1 . . . n which may be accessed by host processor 112, circuitry 110 and/or chipset 114 to read and/or write data thereon. In this embodiment, platform management controller circuitry 110 may be capable of controlling storage device 118 to reserve the reserved area 304. "Reserved area", as used herein with reference to storage device 118 may include a portion of storage device 118 that may be generally accessible to controller circuitry 110, and may be inaccessible from an OS being executed by host system 132. Depending on the media type of storage device 118, the size of reserved area 304 may be defined by, for example, a selected LBA address range and/or selected number of sectors (e.g., sectors 1 . . . m). Platform management controller circuitry 110 may also be capable of concealing reserved area 304 from being accessed by other circuitry, for example, concealing reserved portion 304 from host processor 112 and/or an OS or application being executed on host system 132 and/or chipset 114 and/or one or more remote systems (not shown) to prevent host processor 112 and/or an OS or application being executed on host system 132 and/or chipset 114 and/or one or more remote systems from accessing the reserved area 304 of the storage device 118. In this embodiment, circuitry 110 may be capable of receiving a request to write data on the data area 302 of the storage device 118. The write request may be generated by, for example, host processor a 112 and/or chipset 114. If an error is encountered during a data write attempt, storage device 118 may be capable of signaling that an error has occurred. In response to a signal from storage device 118 that a write error has occurred, circuitry 110 may also be capable of detecting a write error in storage device 118 which may arise during a data write operation. The error may include, for example, a failed data write attempt to one or more sectors of storage device 118, noted in FIG. 3 as an "X".

In response to the write error, circuitry 110 may be capable of remapping the data to the reserved area 304 of storage device 118. "Remapping" or "remap", as used herein, may be defined as changing the physical location of the data from one sector to another sector. "Remapping" may also include updating and/or changing an allocation table which may define where the data resides in storage device 118. Thus, for example as depicted in FIG. 3, sector "X" may be a faulty sector, and circuitry 110 may be capable of remapping data write attempts to sector "Y" of the reserved area 304. Circuitry 110 may also be capable of creating a map relating the location of the "Y" data on reserved area 304 to the "X" sector on the data area 302. Circuitry 110 may also be capable of receiving a read request, and checking the read request against the map, and if the read request is for data that may have been located on sector "X" in the data area 302, circuitry 110 may be capable of redirected the read request to the remapped data on sector "Y" of the reserved area 304.

Platform management controller circuitry 110 may also be capable of arbitrating read and/or write access of storage device 118 to protect reserved area 304 from being accessed. Thus, for example, if host processor 112 generates an I/O transaction to read or write data to storage device 118, platform management controller circuitry 110 may receive this request (via bus 120), and deny the read and/or write request if the data is stored on (or is to be written to) the reserved area 304 of storage device 118 and/or grant the read and/or write request if the data is stored on (or is to be written to) the data area 302 of storage device 118.

Figure 4:
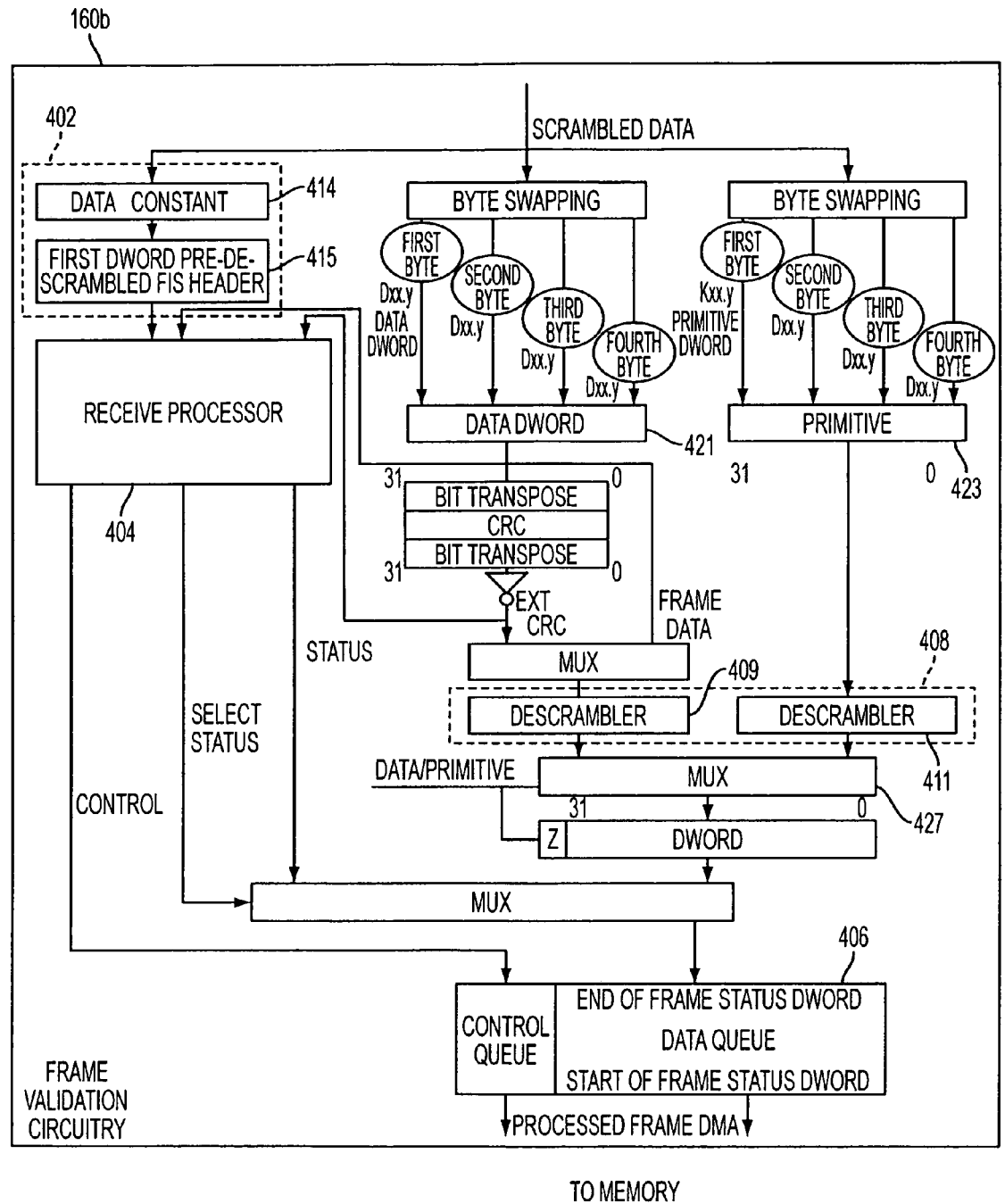
FIG. 4 is a diagram illustrating exemplary operations according to one embodiment.

FIG. 4 is a flowchart 400 illustrating exemplary operations that may be performed according to an embodiment. Operations may include reserving a reserved area in a storage device 402. Operations may also include receiving a write request to write data in the storage device 404. Operations may also include detecting a write error in the storage device 406. Operations may further include remapping the data to the reserved area in the storage device 408. Operations may also include receiving a read request for data in the storage device 410. If the data associated with the read request has been remapped to the reserved area of the storage device, operations may further include redirecting the read request to the remapped data in the reserved area of the storage device 412.

Figure 5:
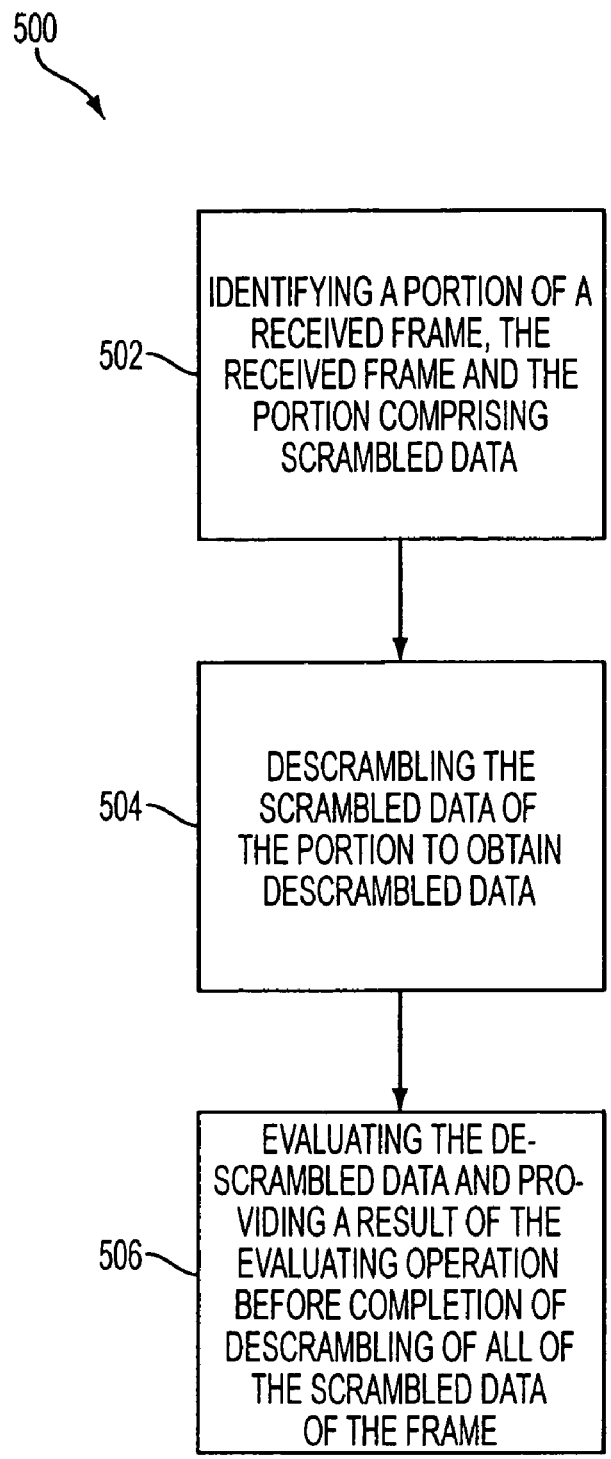
FIG. 5 is a diagram illustrating another system embodiment.

FIG. 5 is a diagram illustrating another system embodiment 500. In FIG. 5, certain portions of the system 100 depicted in FIG. 1 and platform management controller circuitry 110 depicted in FIG. 2 have been omitted for clarity (for example, circuit board 132), but it is to be understood that like parts of FIG. 5 can be implemented in a manner consistent with an embodiment depicted in FIG. 1 and/or FIG. 2, or alternatively in other system implementations, without departing from this embodiment.

In this embodiment, storage device 118 may include a data area 302. The data area 302 may comprise a plurality of sectors 1 . . . n which may be accessed by host processor 112, chipset 114, remote system 140 and/or circuitry 110 to read and/or write data thereon. Circuitry 110 may be capable of communicating with one or more remote systems 140, via network 142. As stated, one or more remote systems 140 may be capable of redundantly storing, in whole or in part, the data on storage device 118. In this embodiment, circuitry 110 may be capable of receiving a request to write data on the data area 302 of the storage device 118. The write request may be generated by, for example, host processor a 112 and/or chipset 114. In this embodiment, circuitry 110 may be capable of performing a data read and/or write request directed to storage device 118, in response to a data read and/or write request from for example, host processor a 112 and/or chipset 114 (which may include an OS read and/or write request). If an error is encountered during a data write attempt, storage device 118 may be capable of signaling that an error has occurred. In response to a signal from storage device 118 that a write error has occurred, circuitry 110 may also be capable of detecting a write error in storage device 118 which may arise during a data write operation. The error may include, for example, a data write attempt to one or more faulty sectors of storage device 118, noted in FIG. 5 as a plurality of "X"s.

In response to the write error, circuitry 110 may be capable of communicating with one or more remote systems 140 (via network 124) to determine if the data associated with the write request exists on one or more remote systems 140. This is depicted in FIG. 5, as the plurality of "Y"s representing data available on the remote system 140. If the data exists remotely, circuitry 110 may be capable of creating a map relating the location of the "Y" data on the remote system to the corresponding "X" sector on the data area 302 of storage device 118. Circuitry 110 may also be capable of receiving a read request, and checking the read request against the map, and if the read request is for data that may have been located on one or more "X" sectors in the data area 302, circuitry 110 may be capable of redirected the read request to the remapped data on the corresponding "Y" sectors of the remote system 140, and retrieving the data from the remote system 140.

If the remote system is unavailable or does not contain the "Y" data (corresponding to the data intended for the "X" sectors of storage device 118), circuitry 110 may, alternatively or additionally, remap the data to the reserved area 304 of storage device 118, in a manner described above with reference to the embodiment of FIG. 3. Circuitry 110 may also be capable of creating a map relating the location of the "Y" data on reserved area 304 to the "X" sector on the data area 302, and in a manner described above with reference to FIG. 3, remap read requests for that data to the reserved area 304. Alternatively or additionally, if the remote system 140 does not contain the "Y" data (corresponding to the data intended for the "X" sectors of storage device 118), circuitry 110 may be capable of remapping the data to the remote system 140, and thus storing the data remotely.

Figure 6:
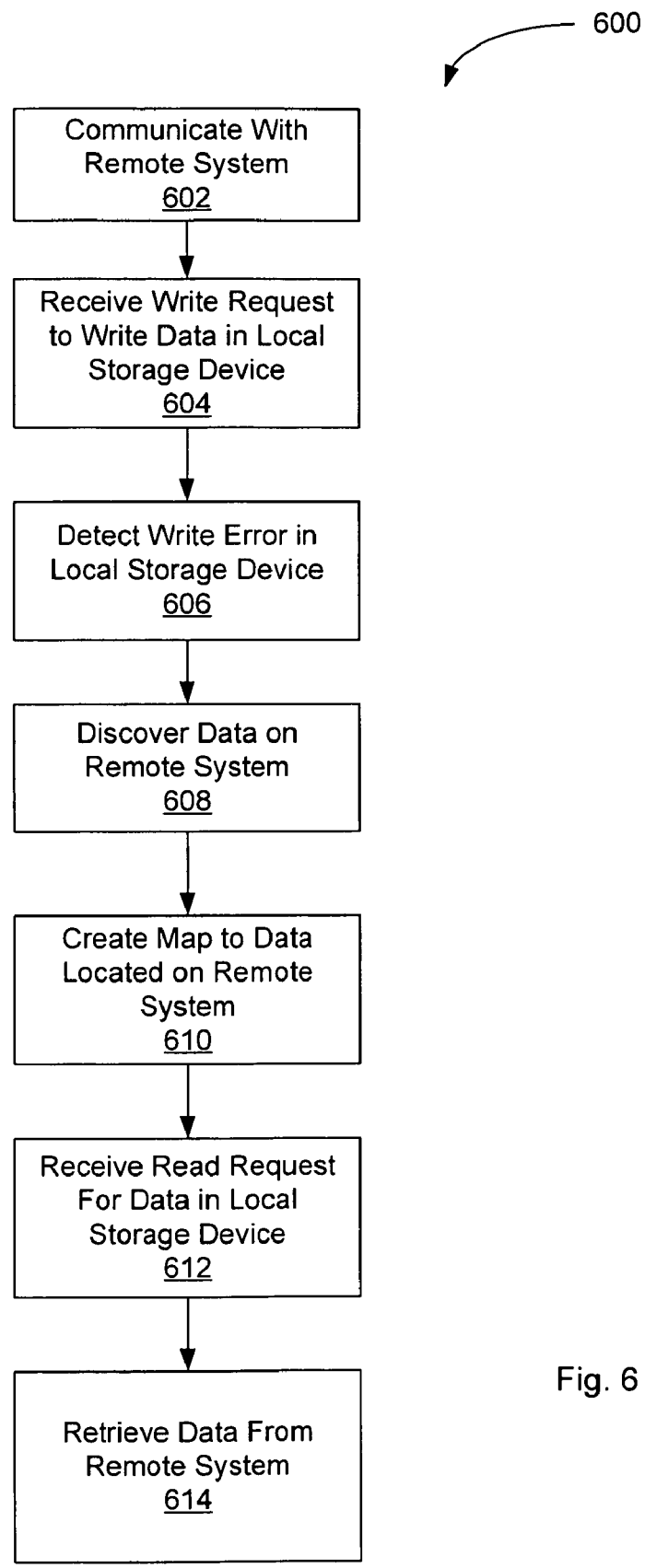
FIG. 6 is a diagram illustrating exemplary operations according to another embodiment.

FIG. 6 is a flowchart illustrating exemplary operations 600 that may be performed according to another embodiment. Operations may include communicating with a remote system 602. Operations may further include receiving a write request to write data in a local storage device 604. Operations may also include detecting a write error in the local storage device 606. Operations may also include discovering the data associated with the write request on the remote system 608. If the data is located remotely, operations may also include creating a map to the data on the remote system 610. Operations may also include receiving a read request for data in the local storage device 612. If the data associated with the read request has been remapped to the remote system, operations may further include retrieving the data from the remote system 612.

Figure 7:
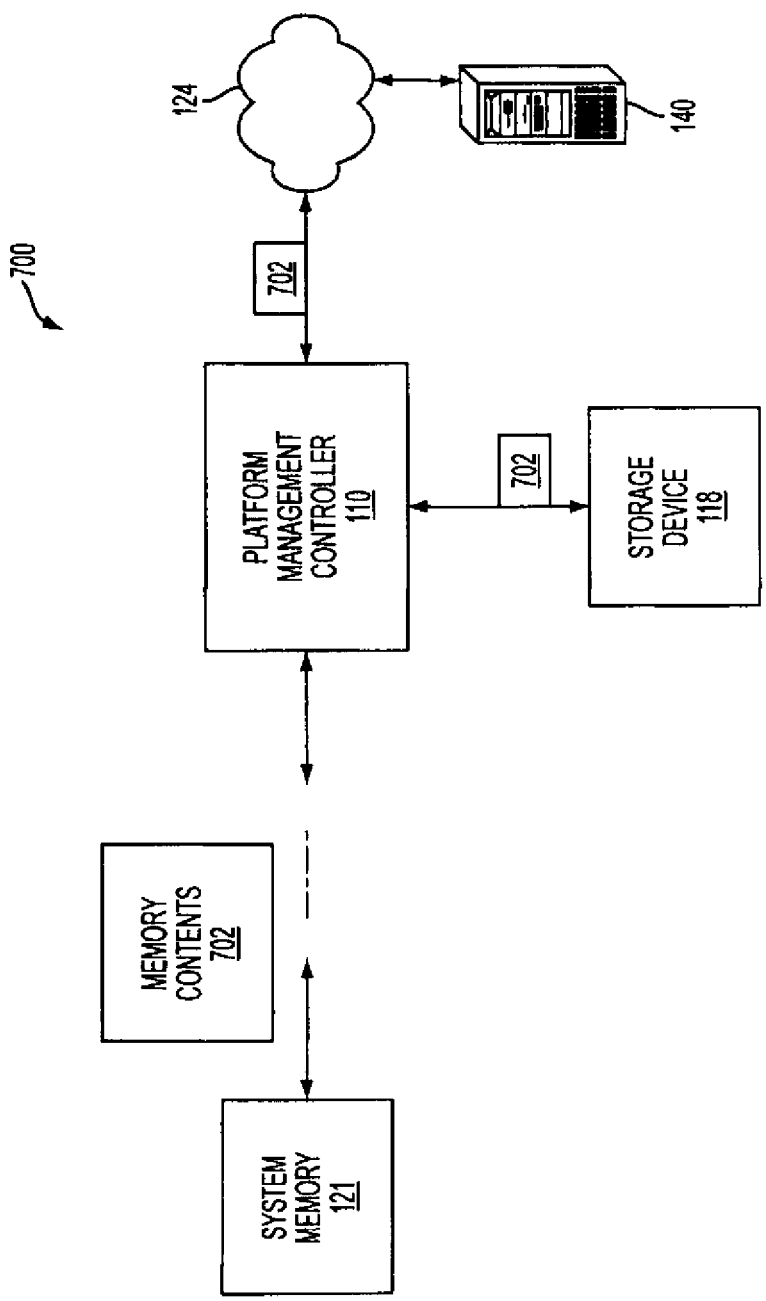
FIG. 7 is a diagram illustrating another system embodiment.
Figure 8:
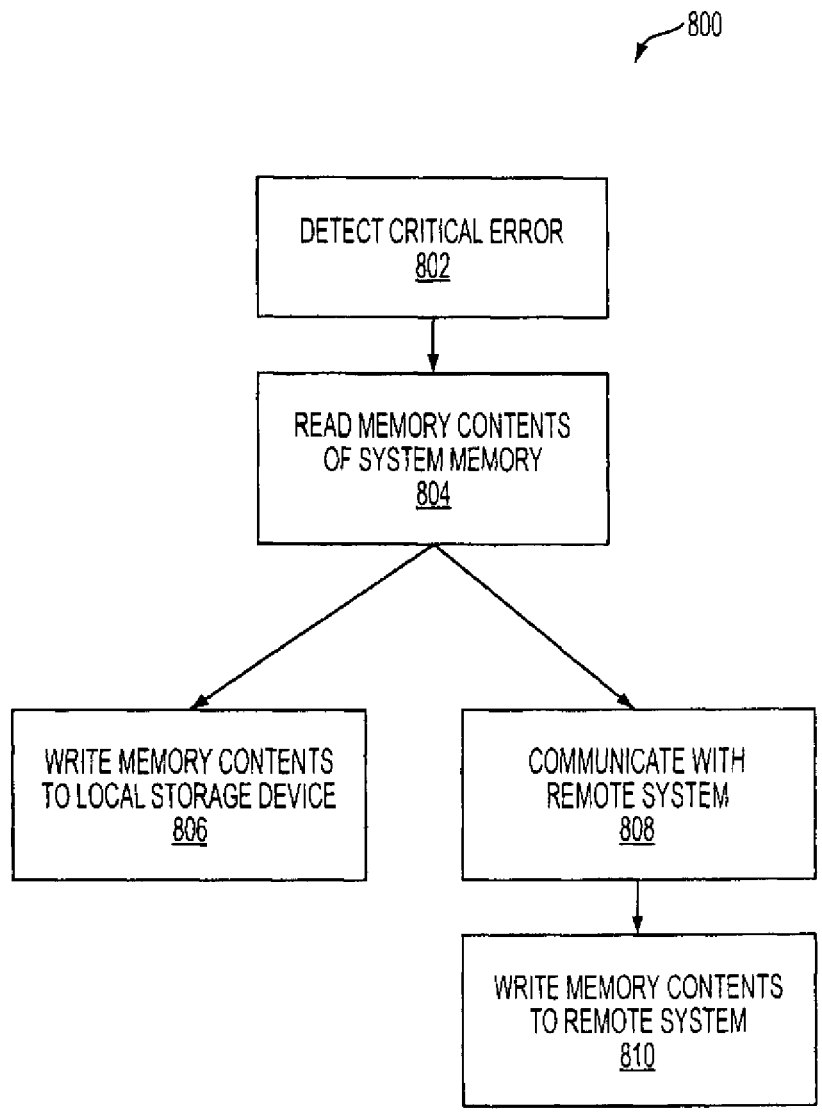
Figure 9:
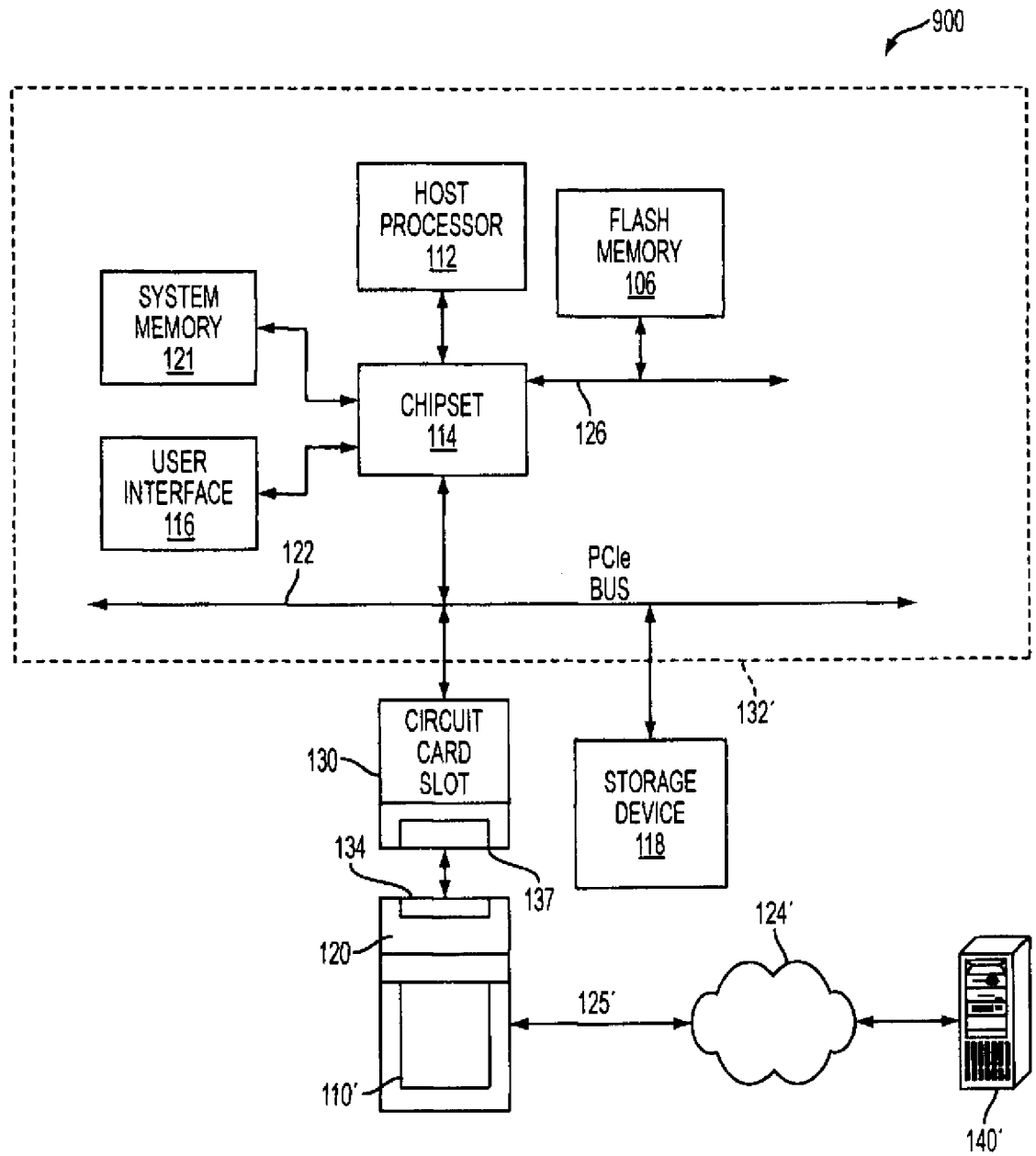

FIG. 7 is a diagram illustrating another system embodiment 700. In FIG. 7, certain portions of the system 100 depicted in FIG. 1 and platform management controller circuitry 110 depicted in FIG. 2 have been omitted for clarity (for example, circuit board 132), but it is to be understood that like parts of FIG. 7 can be implemented in a manner consistent with an embodiment depicted in FIG. 1 and/or FIG. 2, or alternatively in other system implementations, without departing from this embodiment.

In this embodiment, platform management controller circuitry 110 may be capable of reading the memory contents 702 of system memory 121. Circuitry 110 may also be capable of writing the memory contents 720 of system memory 121 to storage device 118 (and this operation may be performed in a manner similar to the embodiment described above with reference to FIG. 3). Alternatively or additionally, circuitry 110 may also be capable of writing the memory contents 720 of system memory 121 to one or more remote system 140, via network 124 (and this operation may be performed in a manner similar to the embodiment described above with reference to FIG. 5). For example, a critical error may occur which may prevent an OS and/or application being executed on a host system from accessing memory. If a critical error occurs, memory processor 112 and/or chipset 114 may be capable of signaling that an error has occurred. In response to a signal from processor 112 and/or chipset 114 that a critical error has occurred, circuitry 110 may be capable of detecting a critical error and storing the memory contents 121 to storage device 118 or remote system 140 (or both). This may enable, for example, an audit of the data in system memory 121 at the time of the critical error.

Figure 8:
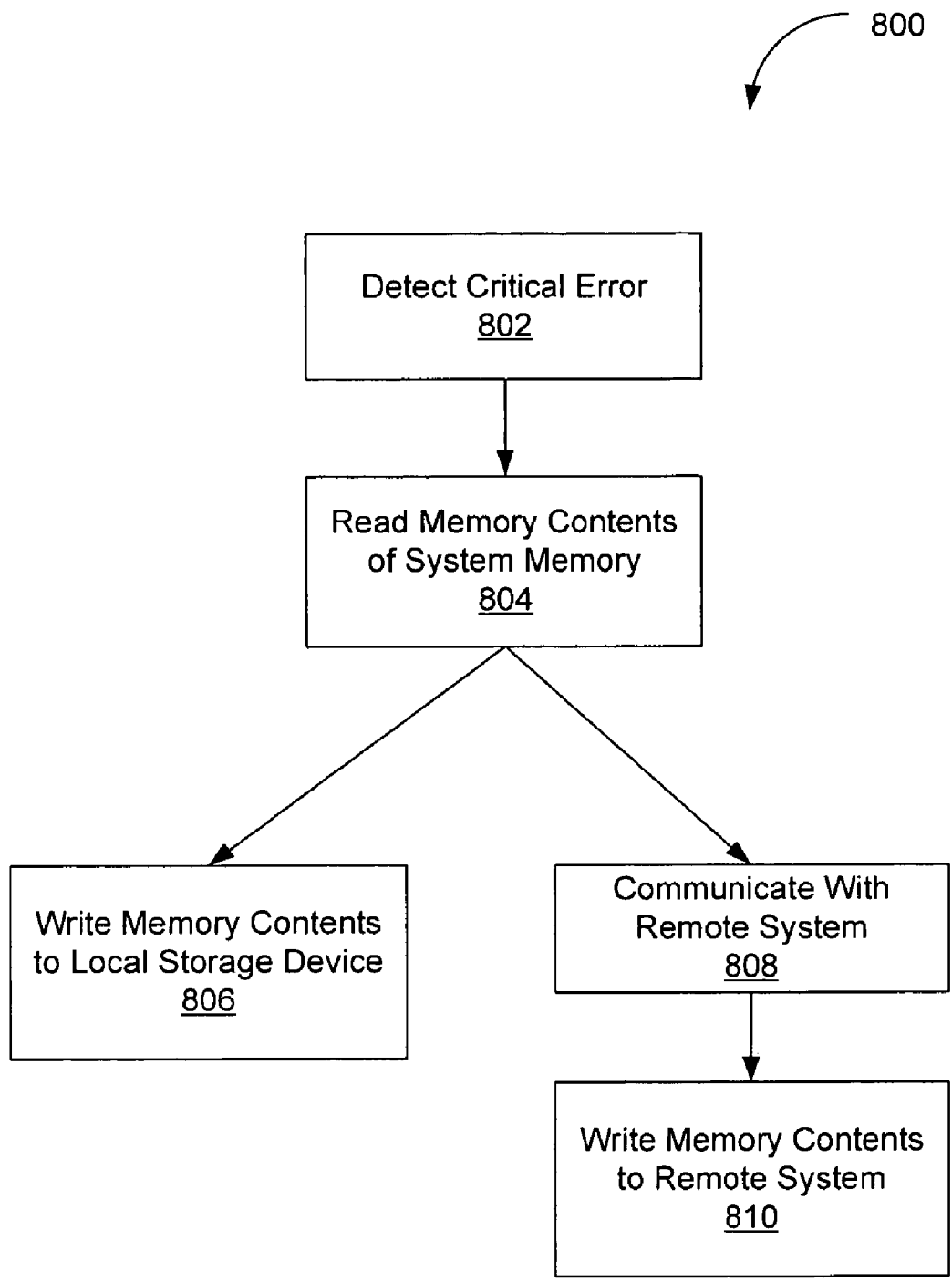
FIG. 8 is a diagram illustrating exemplary operations according to another embodiment.

FIG. 8 is a flowchart illustrating exemplary operations 800 that may be performed according to another embodiment. Operations may include detecting a critical error 802. Operations may further include reading the memory contents of system memory 804. Operations may also include writing the memory contents to a local storage device 806. Alternatively or additionally, operations may include communicating with a remote system 808, and writing the memory contents to the remote system 810.

Figure 9:
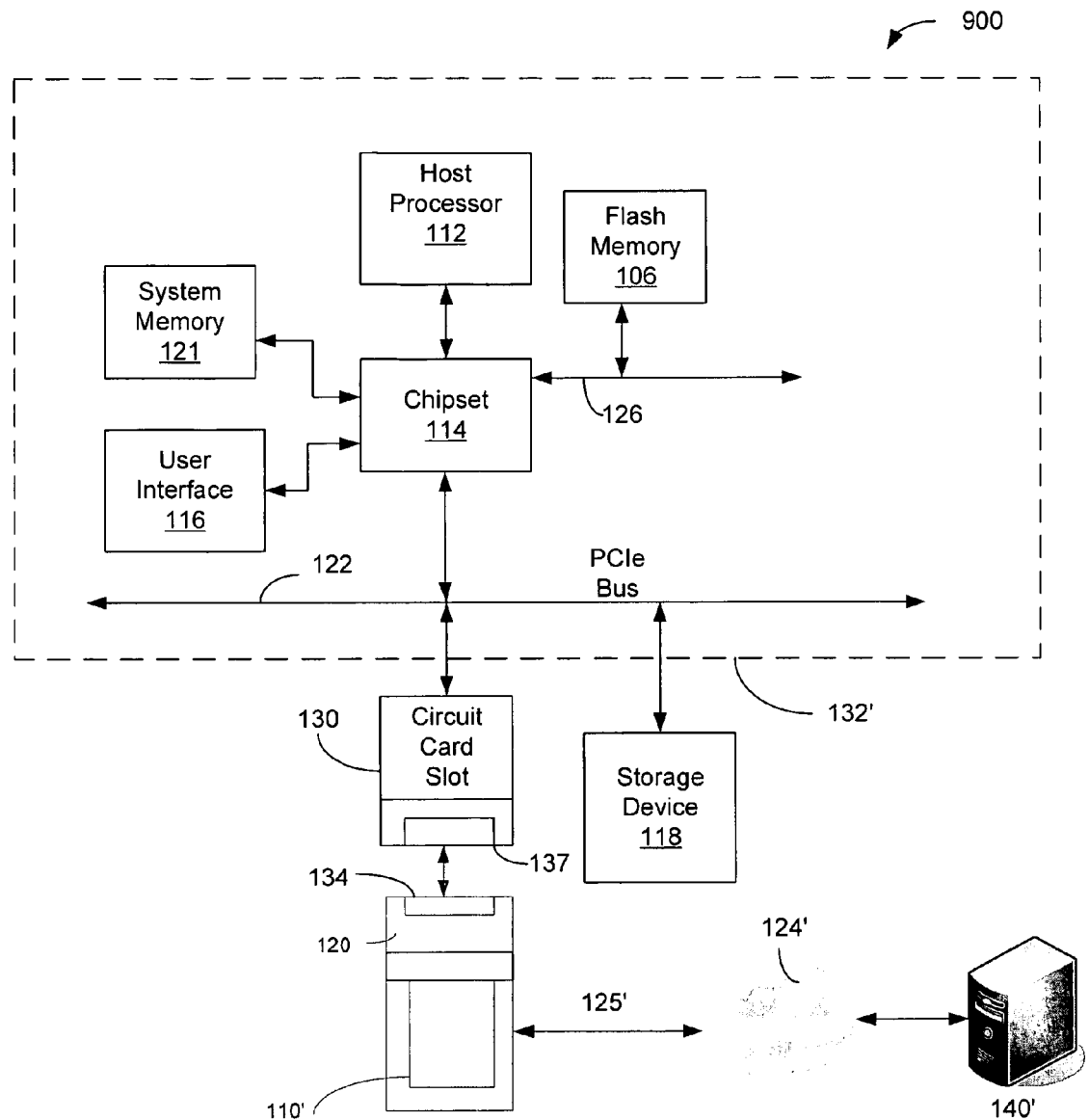
FIG. 9 is a diagram illustrating another system embodiment.
Figure 1:
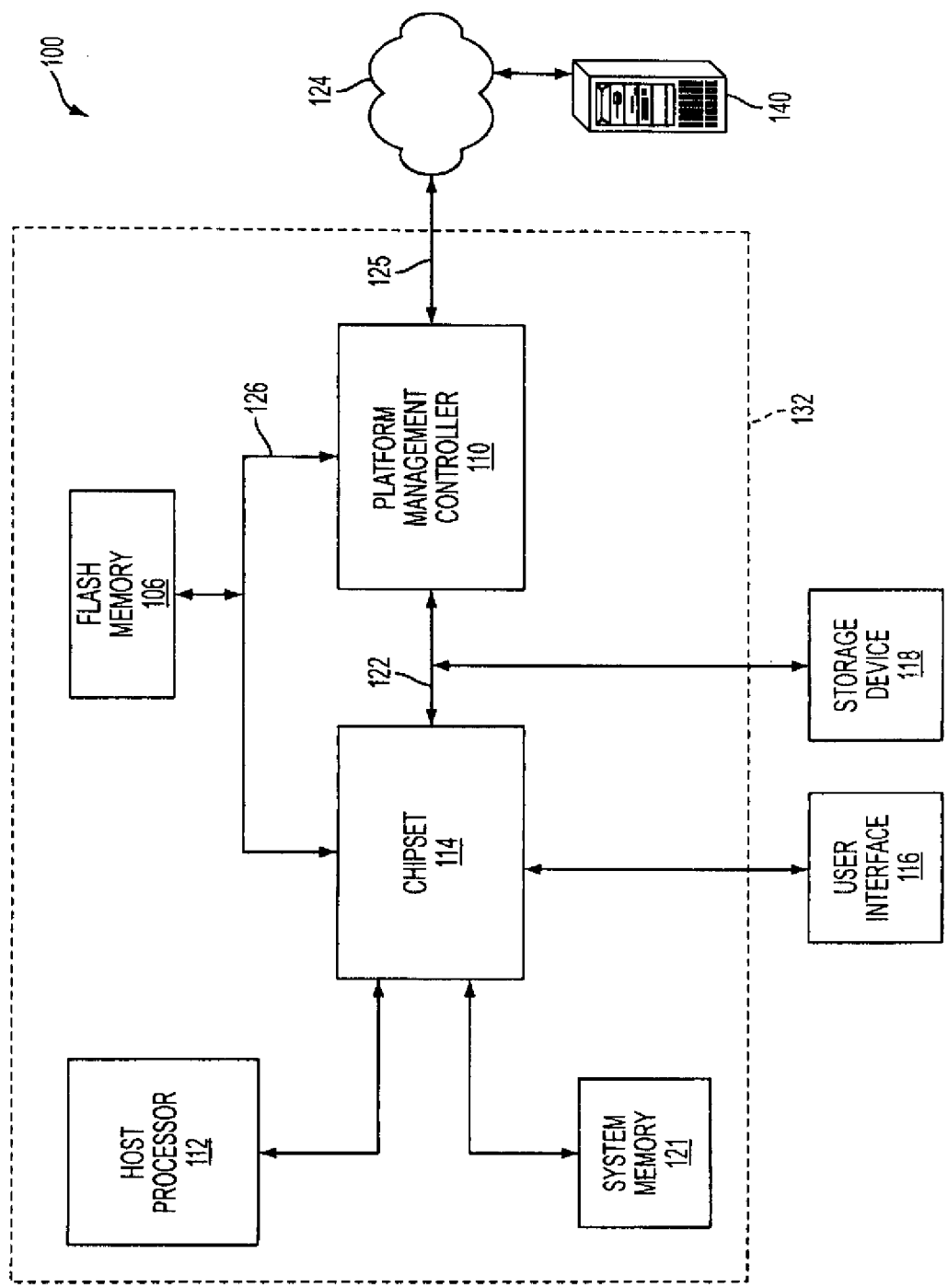
Figure 2:
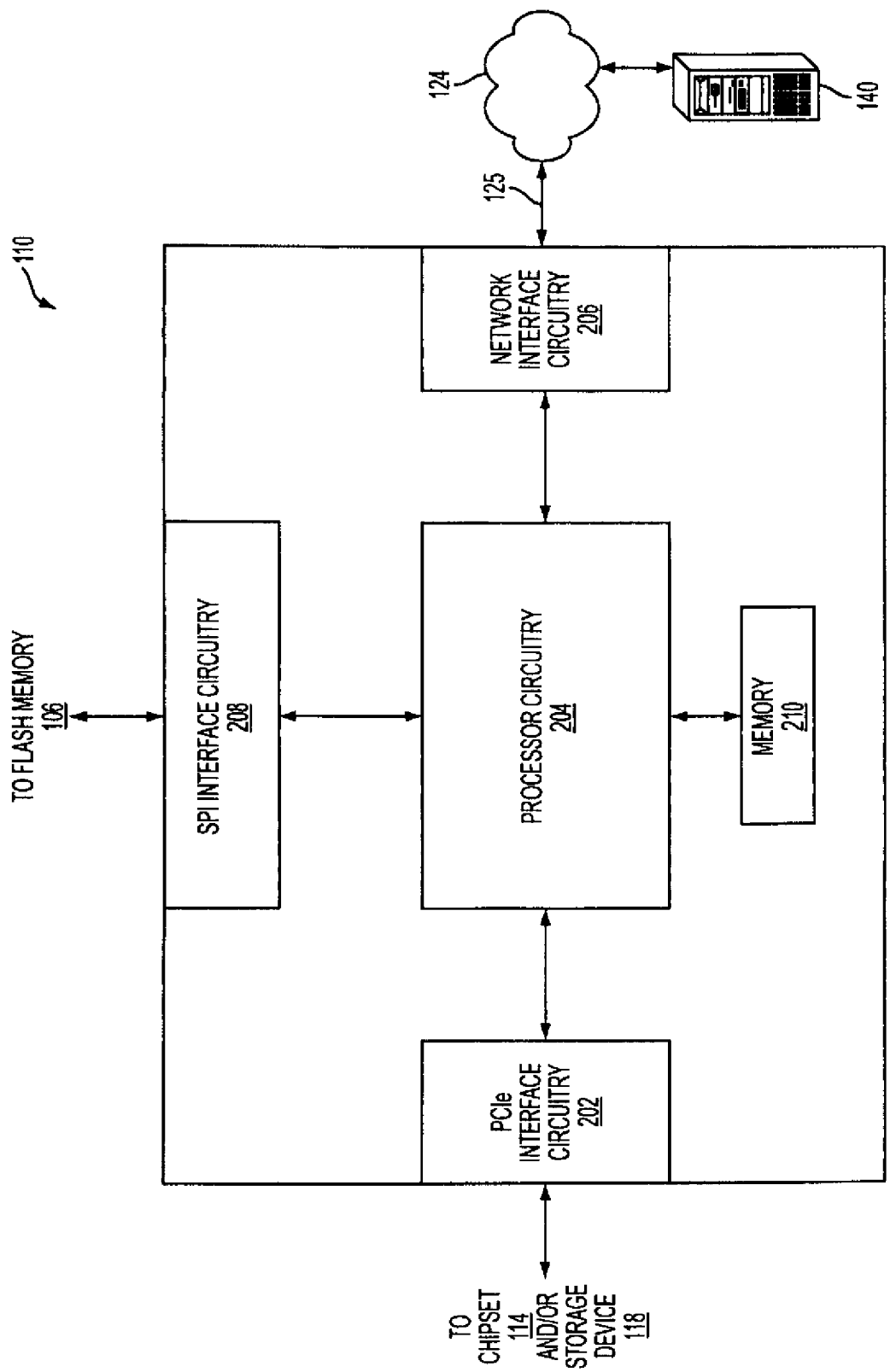
Figure 3:
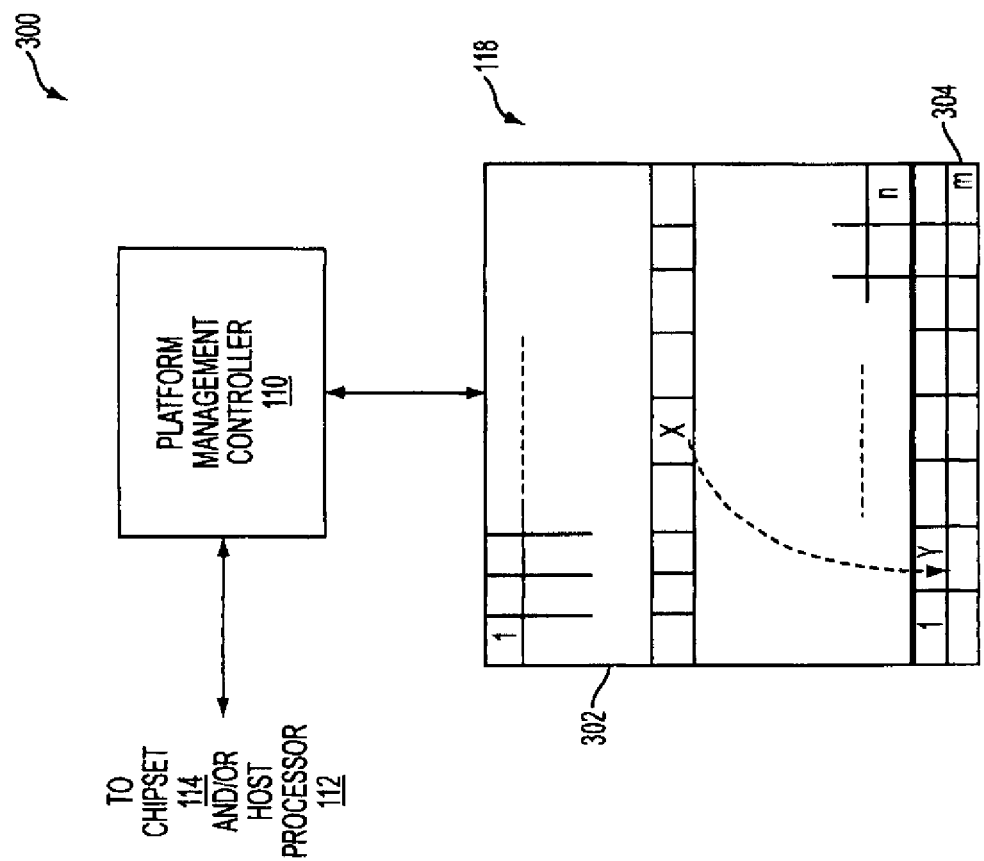
Figure 4:
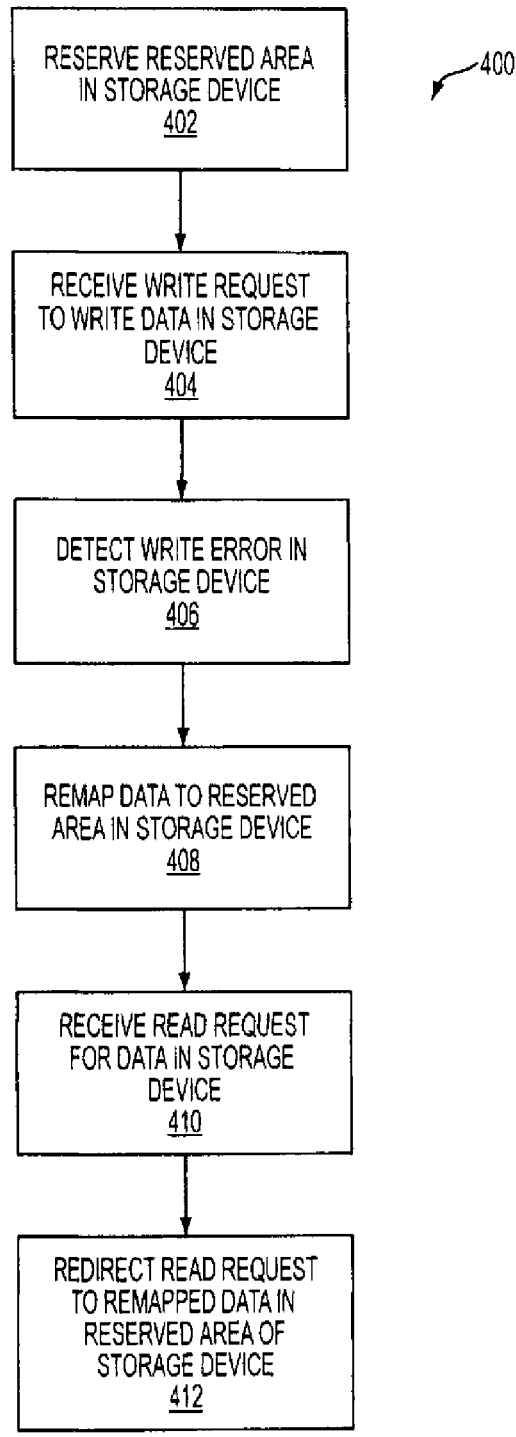
Figure 5:
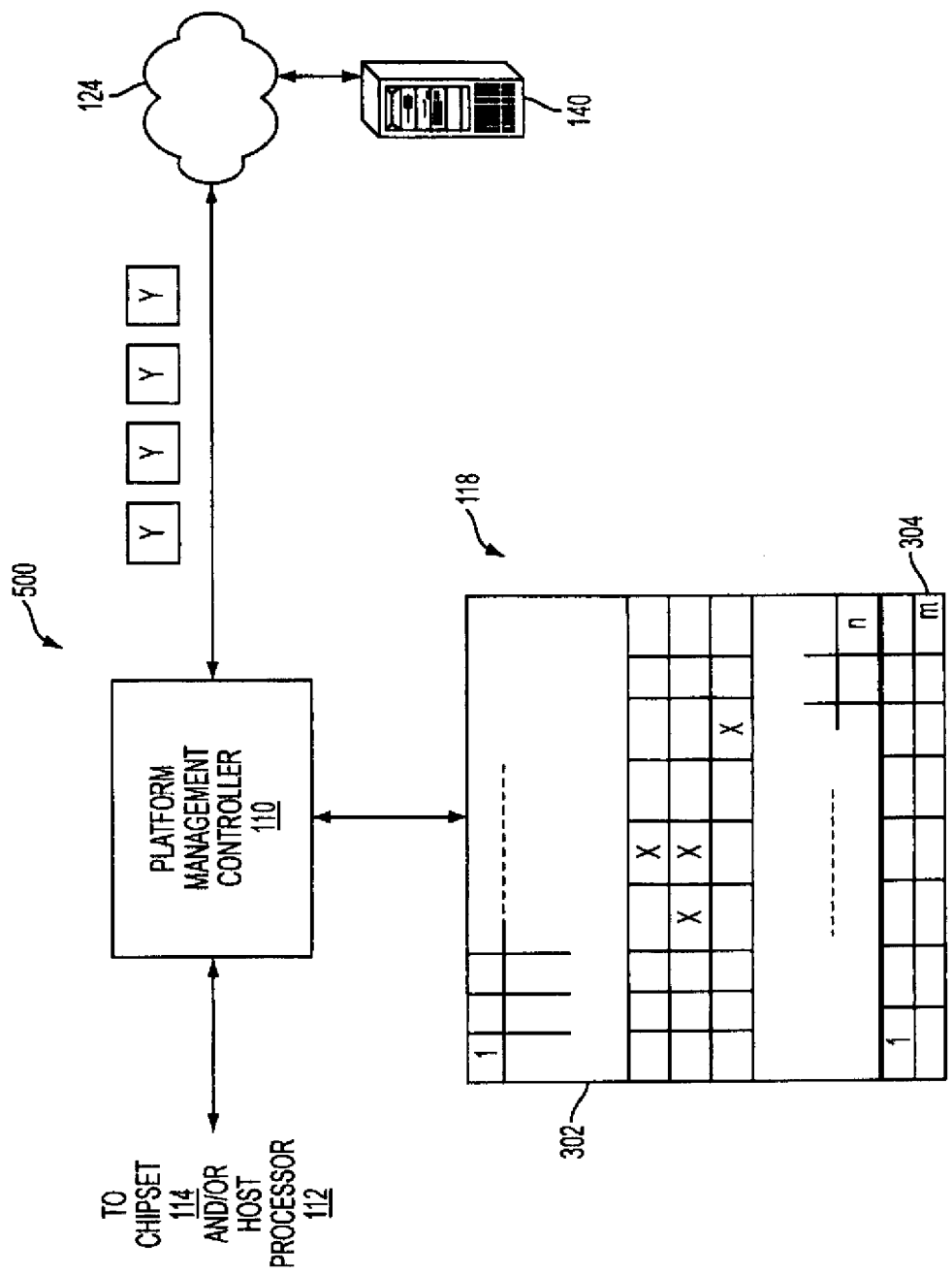
Figure 6:
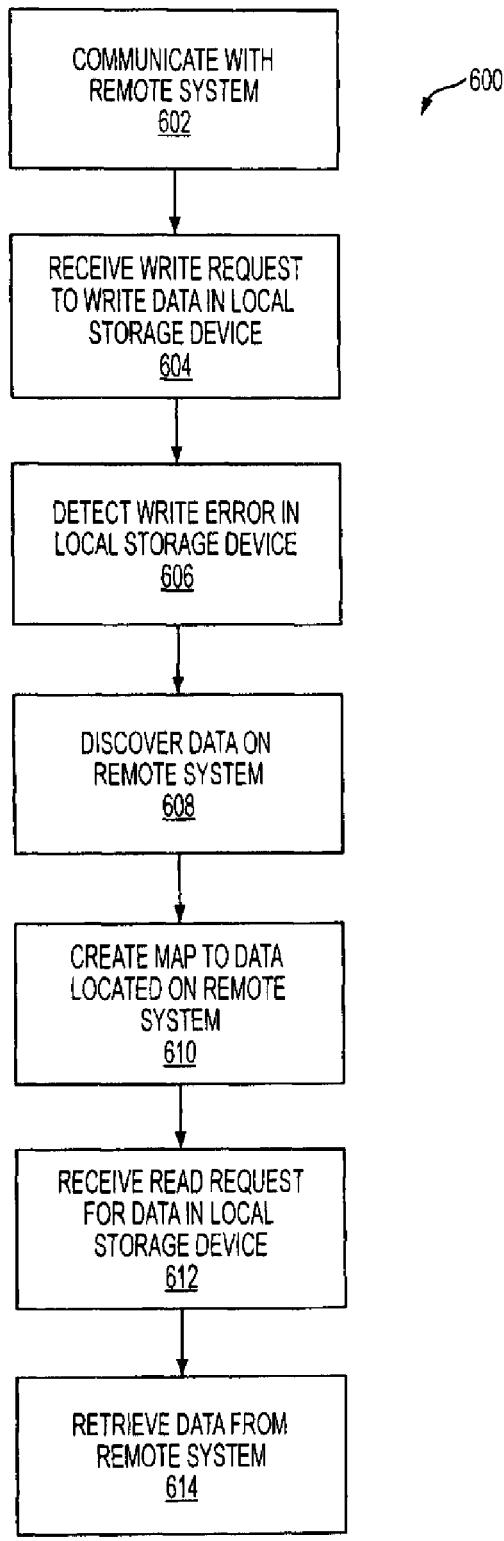

FIG. 9 illustrates another system embodiment 900 of the claimed subject matter. In this embodiment, platform management controller circuitry 110' may be comprised in a circuit card 120 which may be coupled to bus 122. As with the embodiment of FIG. 1, platform management controller circuitry 110' may be comprised in, or form part of, one or more integrated circuit chips. This embodiment may include a circuit card slot 130. The circuit card 120 may be constructed to permit it to be inserted into slot 130. When the circuit card 120 is properly inserted into slot 130, connectors 134 and 137 may become electrically and mechanically coupled to each other. When connectors 134 and 137 are so coupled to each other, the card 120 may become electrically coupled to bus 122 and may exchange data and/or commands with system memory 121, host processor 112, user interface system 116 and/or flash memory 106 via bus 122 and/or bus 126 and chipset 114. Alternatively or additionally, platform management controller circuitry 110' may exchange commands and data with host system 132' and one or more remote systems coupled to network 124', via communications link 125'. The operation of platform management circuitry 110 in this embodiment may be identical to the operation described above with reference to FIGS. 1-3, except that SPI bus interface circuitry 308 may be omitted and instead commands and data may be exchanged between circuit card 120 and flash memory 106 via chipset 114.

Thus, in summary, at least one embodiment herein may include an integrated circuit capable of receiving a write request to write data in a local storage device. The integrated circuit of this embodiment may also be capable of detecting a write error in the local storage device. The integrated circuit of this embodiment may also be capable of creating a reserved area in the local storage device. The integrated circuit of this embodiment may also be capable of remapping the data corresponding to the write error to the reserved area of the local storage device.

Advantageously, the integrated circuit of this embodiment may permit storing of event logs and data on the reserved portion of the storage device which may be used for system audits. Further advantageously, the integrated circuit of this embodiment may be able to store data in a secure (concealed) reserved portion of the storage device which may be inaccessible to operating system read/write operations. Also, the integrated circuit of this embodiment may be capable of saving host system memory contents to the reserved portion of the storage device and/or to a remote system to permit, for example, audit and recovery of memory contents when a host system critical error occurs. The integrated circuit of this embodiment may also be capable of performing one or more operations independently of an operating system.

The terms and expressions which have been employed herein are used as terms of description and not of limitation, and there is no intention, in the use of such terms and expressions, of excluding any equivalents of the features shown and

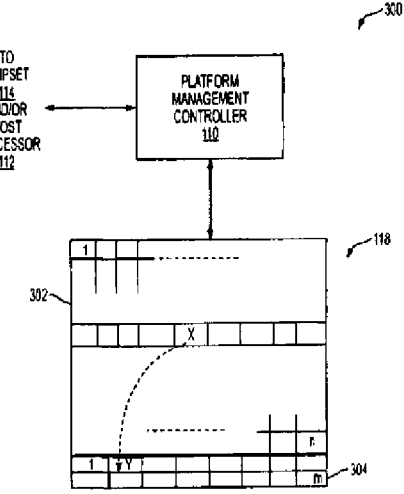

What is claimed is:

1. An apparatus, comprising:
an integrated circuit capable of receiving a write request to write data in a local storage device, said integrated circuit being further capable of detecting a write error involving the local storage device, said integrated circuit being further capable reserving a reserved area in said local storage device, said integrated circuit being further capable of remapping the data corresponding to said write error to said reserved area of the local storage device, said integrated circuit is further capable of communicating with a remote system coupled to said integrated circuit and discovering data corresponding to said write error, said integrated circuit is further capable of creating a map to the data located on the remote system.

2. The apparatus of claim 1, wherein:
said integrated circuit is further capable of receiving at least one data read request to read said data corresponding to said write error and redirecting said data read request to said reserved area of said local storage device.

3. The apparatus of claim 1, wherein:
said integrated circuit is further capable of receiving at least one data read request to read said data corresponding to said write error and retrieving said data corresponding to said write error from said remote system.

4. The apparatus of claim 1, wherein:
said integrated circuit is further capable of detecting a host system critical error, reading memory contents of a host system memory, and writing said memory contents to said local storage device.

5. The apparatus of claim 1, wherein:
said integrated circuit is further capable of detecting a host system critical error and reading memory contents of a host system memory, said integrated circuit is further capable of communicating with a remote system coupled to said integrated circuit and writing said memory contents to said remote system.

6. A system, comprising:
at least one circuit card being capable of being coupled to a bus, said circuit card comprising an integrated circuit receiving a write request to write data on a local storage device, said an integrated circuit capable of receiving a write request to write data in a local storage device, said integrated circuit being further capable of detecting a write error involving the local storage device, said integrated circuit being further capable reserving a reserved area in said local storage device, said integrated circuit being further capable of remapping the data corresponding to said write error to said reserved area of the local storage device, said integrated circuit is further capable of detecting a host system critical error, reading memory contents of a host system memory, and writing said memory contents to said local storage device.

7. The system of claim 6, wherein:
said integrated circuit is further capable of receiving at least one data read request to read said data corresponding to said write error and redirecting said data read request to said reserved area of said local storage device.

8. The system of claim 6, wherein:
said integrated circuit is further capable of communicating with a remote system coupled to said integrated circuit and discovering data corresponding to said write error, said integrated circuit is further capable of creating a map to the data located on the remote system.

9. The system of claim 8, wherein:
said integrated circuit is further capable of receiving at least one data read request to read said data corresponding to said write error and retrieving said data corresponding to said write error from said remote system.

10. The system of claim 6, wherein:
said integrated circuit is further capable of detecting a host system critical error and reading memory contents of a host system memory, said integrated circuit is further capable of communicating with a remote system coupled to said integrated circuit and writing said memory contents to said remote system.

11. An article comprising:
a storage medium storing instructions that when executed by a machine result in the following operations:
receiving a write request to write data in a local storage device;
detecting a write error in the local storage device;
reserving a reserved area in said local storage device;
remapping the data corresponding to said write error to said reserved area of the local storage device;
communicating with a remote system and discovering data corresponding to said write error; and
creating a map to the data located on the remote system.

12. The article of claim 11, wherein said instructions that when executed by said machine result in the following additional operations:
receiving at least one data read request to read said data corresponding to said write error; and
redirecting said data read request to said reserved area of said local storage device.

13. The article of claim 11, wherein said instructions that when executed by said machine result in the following additional operations:
receiving at least one data read request to read said data corresponding to said write error; and
retrieving said data corresponding to said write error from said remote system.

14. The article of claim 11, wherein said instructions that when executed by said machine result in the following additional operations:
detecting a host system critical error;
reading memory contents of a host system memory; and
writing said memory contents to said local storage device.

15. The article of claim 11, wherein said instructions that when executed by said machine result in the following additional operations:
detecting a host system critical error and reading memory contents of a host system memory; and
communicating with a remote system and writing said memory contents to said remote system.

16. A method, comprising:
receiving a write request to write data in a local storage device;
detecting a write error in the local storage device;
reserving a reserved area in said local storage device;
remapping the data corresponding to said write error to said reserved area of the local storage device;
communicating with a remote system and discovering data corresponding to said write error; and
creating a map to the data located on the remote system.

17. The method of claim 16, further comprising:
receiving at least one data read request to read said data corresponding to said write error; and redirecting said data read request to said reserved area of said local storage device.

18. The method of claim 16, further comprising:

receiving at least one data read request to read said data corresponding to said write error; and retrieving said data corresponding to said write error from said remote system.

19. The method of claim 16, further comprising:

detecting a host system critical error;

reading memory contents of a host system memory; and writing said memory contents to said local storage device.

20. The method of claim 16, further comprising:

detecting a host system critical error and reading memory contents of a host system memory; and communicating with a remote system and writing said memory contents to said remote system.

* * * * *

UNITED STATES PATENT AND TRADEMARK OFFICE
CERTIFICATE OF CORRECTION

PATENT NO. : 7,412,619 B2  Page 1 of 11
APPLICATION NO. : 11/085421
DATED : August 12, 2008
INVENTOR(S) : Vincent J. Zimmer et al.

It is certified that error appears in the above-identified patent and that said Letters Patent is hereby corrected as shown below:

Delete the title page and substitute therefore the attached title page consisting of corrected illustrative figure.

Delete Drawing Sheets 1-9 and substitute therefore the attached Drawing Sheets 1-9.

Signed and Sealed this

Fifth Day of January, 2010

David J. Kappos
*Director of the United States Patent and Trademark Office*

(12) United States Patent
Zimmer et al.

(10) Patent No.: US 7,412,619 B2
(45) Date of Patent: Aug. 12, 2008

(54) INTEGRATED CIRCUIT CAPABLE OF ERROR MANAGEMENT

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 11/085,421

(22) Filed: Mar. 21, 2005

(65) Prior Publication Data
US 2006/0236166 A1   Oct. 19, 2006

(51) Int. Cl.
*G06F 11/00* (2006.01)

(52) U.S. Cl. .............. 714/6; 714/8; 714/7; 714/710; 714/720

(58) Field of Classification Search .............. 714/6, 714/7, 8, 710, 720
See application file for complete search history.

(56) References Cited

U.S. PATENT DOCUMENTS

| | | | |
|---|---|---|---|
| 4,471,427 A * | 9/1984 | Harris | 710/22 |
| 5,524,212 A | 6/1996 | Somani et al. | |
| 5,701,516 A * | 12/1997 | Cheng et al. | 710/22 |
| 5,860,083 A | 1/1999 | Sukegawa | |
| 5,933,852 A * | 8/1999 | Jeddeloh | 711/153 |
| 6,016,530 A | 1/2000 | Auclair et al. | |
| 6,052,798 A * | 4/2000 | Jeddeloh | 714/8 |
| 6,345,368 B1 * | 2/2002 | Bergsten | 714/11 |
| 6,360,306 B1 * | 3/2002 | Bergsten | 711/162 |
| 6,446,175 B1 * | 9/2002 | West et al. | 711/162 |
| 6,629,192 B1 | 9/2003 | Schaefer et al. | |
| 6,782,453 B2 * | 8/2004 | Keltcher et al. | 711/133 |
| 6,907,505 B2 * | 6/2005 | Cochran et al. | 711/162 |
| 6,925,533 B2 * | 8/2005 | Lewis | 711/118 |
| 6,973,517 B1 | 12/2005 | Golden et al. | |
| 7,020,034 B2 * | 3/2006 | Chen | 365/200 |
| 7,055,055 B1 | 5/2006 | Schneider et al. | |
| 7,275,179 B1 * | 9/2007 | Coatney | 714/7 |
| 2002/0083264 A1 | 6/2002 | Coulson | |
| 2003/0177322 A1 * | 9/2003 | Crockett et al. | 711/161 |
| 2005/0033908 A1 | 2/2005 | Chong et al. | |

(Continued)

FOREIGN PATENT DOCUMENTS

WO   WO-9750035 A1   12/1997

(Continued)

OTHER PUBLICATIONS

PCI Express Base Specification Revision 1.0, Jul. 22, 2002, 15 pgs.

(Continued)

*Primary Examiner*—Bryce P Bonzo
(74) *Attorney, Agent, or Firm*—Grossman, Tucker, Perreault & Pfleger, PLLC

(57) ABSTRACT

A method according to one embodiment may include receiving a write request to write data in a local storage device. The method of this embodiment may also include detecting a write error in the local storage device. The method of this embodiment may also include reserving a reserved area in the local storage device and remapping the data corresponding to the write error to the reserved area of the local storage device. Of course, many alternatives, variations, and modifications are possible without departing from this embodiment.

20 Claims, 9 Drawing Sheets